Figure 1:
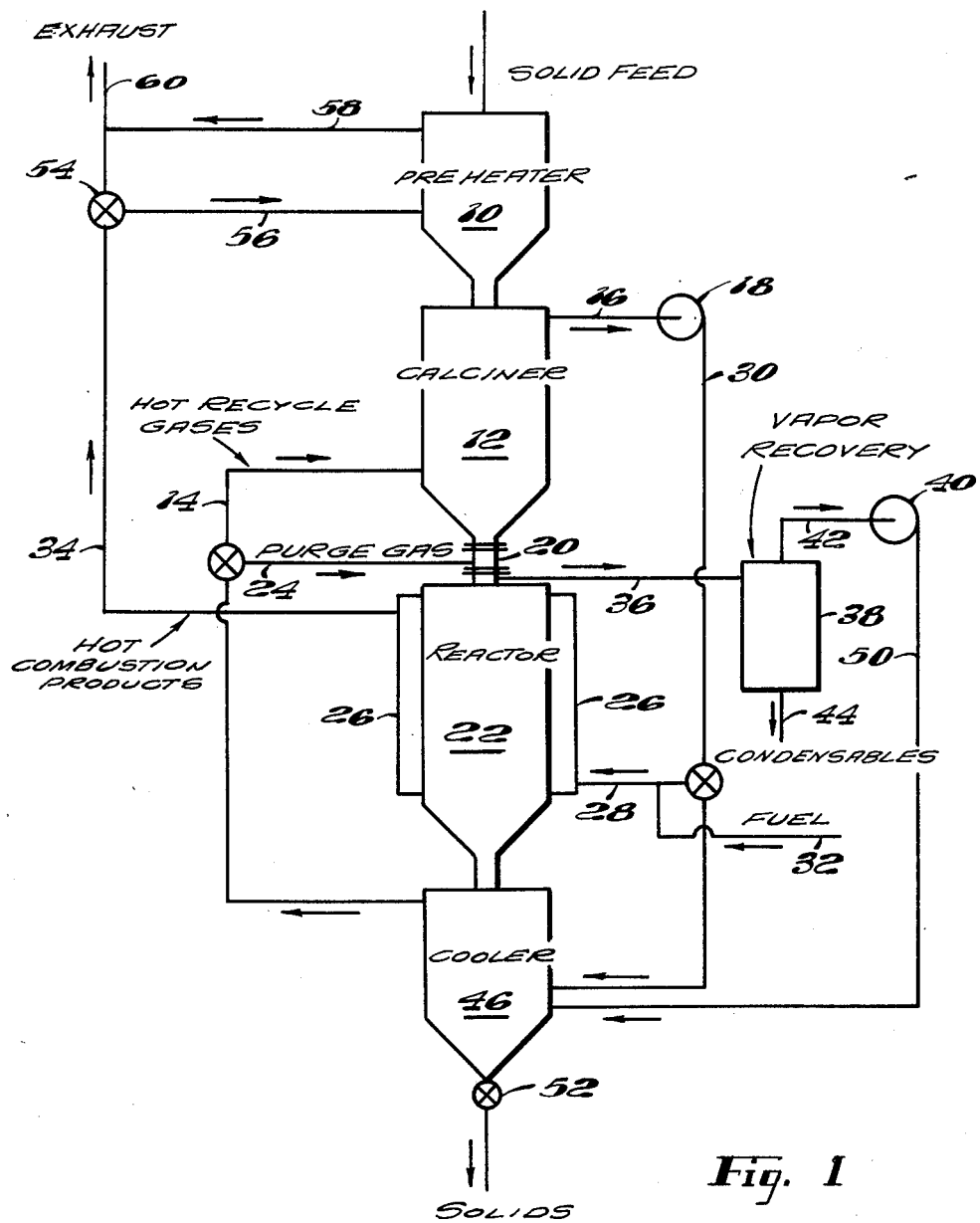

United States Patent Office 2,924,511
Patented Feb. 9, 1960

2,924,511

PROCESS FOR HEAT TREATING PARTICULATE MATERIAL

Harold Reintjes, Short Hills, Robert H. Hughes, Glen Ridge, and Charles S. Livermore, Rutherford, N.J., assignors to Petrocarb Equipment, Inc., New York, N.Y., a corporation of Delaware Application January 4, 1956, Serial No. 557,305

14 Claims. (Cl. 23—223)

This invention relates to a novel process for heat treating solid materials involving various stages of heating by different means for the separate recovery of different values from a given charge. It is characterized by remarkable efficiency and is carried out in steps not heretofore contemplated by the prior art. The process of this invention is particularly applicable to the devolatilization or dehydrogenation of carbonaceous materials and the like and to the winning of elements such as phosphorous and sodium from ores containing the same.

The process of this invention comprises the steps of conducting the material to be reduced as a charge of solids seriatim through a directly heated calciner, a seal zone, an indirectly heated reactor and a cooler, while simultaneously cycling gases through calciner and cooler, the gases acquiring heat in the cooler and giving up heat to the material in the calciner. The solid charge material may be in any convenient form best suited for flow through the particular apparatus employed for the purpose. For example, if the material is essentially carbonaceous it may advantageously be in particulate form; if a mixture of ore, carbon and fluxing agent, it is preferably in briquet or otherwise agglomerated form. Preferably, the charge will be preheated prior to delivery to the calciner and the preheater may be a part of the overall apparatus for the process as described in detail hereinafter.

In the calciner, where reaction first commences, the charge is heated to suitable devolatilization temperature, for example to about 1400–1500° F., and volatile impurities are driven off and removed from the calciner. In this step, also, the material in the charge, if so constituted, commences to flux, but fluxing action is not permitted to continue to the extent that the discrete particles, lumps or agglomerates will stick together and interrupt solid flow. The charge then passes into an indirectly heated reactor in which the charge is heated to reaction temperature which may be as high as 2400° F. but not appreciably higher owing to the inability of most materials of construction to tolerate much greater heat. In the course of the reaction the charge is reduced to its solid and gaseous products directly from the solid to the plastic to the gaseous state which products are conducted to appropriate recovery apparatus. The hot solid product or by-product, as the case may be, flows to a cooler where it is contacted by gases discharged from the calciner and/or from the initially gaseous product recovery system. The solid product is thereby cooled while the gases are heated.

It will be seen that this process is remarkably simple to carry out, makes efficient use of the waste heat necessarily developed for the reaction and, as a side but important effect, permits of charging and using as reducing agents high volatile carbonaceous materials which are normally less expensive that the usual calcined or pretreated cokes and coals and low volatile coals heretofore employed for the usual reactions. The process is also continuous in all respects.

It is the principal object of this invention to provide a novel process for reacting solid materials at successively different temperatures and by successively different means of heating for the purpose of changing the characteristics of the solid and recovering initially gaseous or vaporous products or by-products therefrom.

It is a further object of this invention to provide such a process in which heat is effectively conserved.

It is a specific object of this invention to provide such a process for the production of metallic and nonmetallic elements, more particularly phosphorous, sodium and the like, from minerals with which initially combined by reduction thereof.

Figure 2:
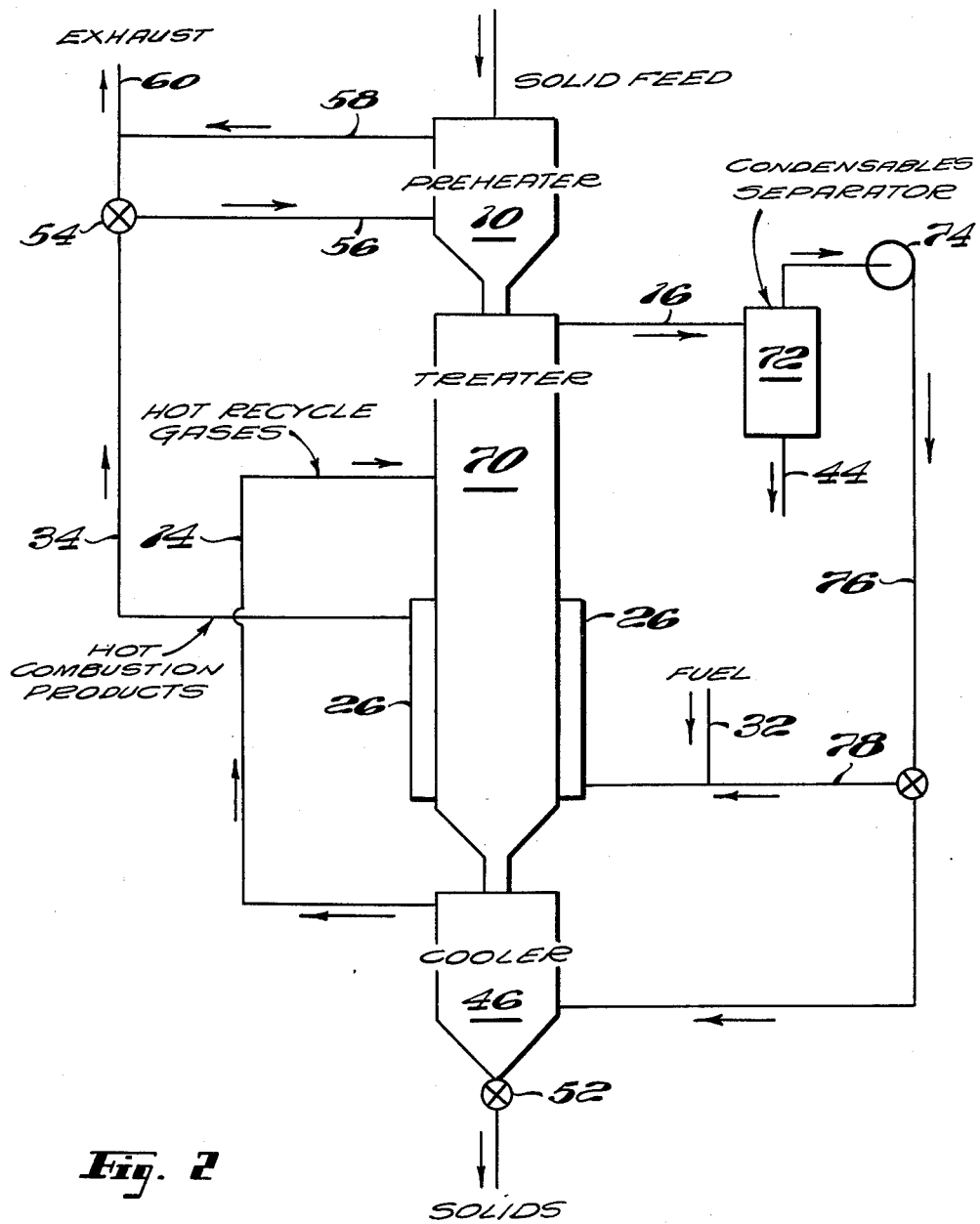

These and the other objects of this invention will best be understood and appreciated from the following description thereof taken in connection with the accompanying drawings which are flow diagrams thereof showing suitable apparatus therefore schematically, that of Fig. 1 being primarily adapted to the production of phosphorous and that of Fig. 2 to the devolatilization of carbonaceous materials. Referring first to Fig. 1, solid raw material in particulate form is fed to the top of indirectly heated preheater 10 and flows from there into directly heated calciner 12. Hot gas is introduced into the lower area of the calciner through conduit 14 and flows upwardly through the charge and is withdrawn through conduit 16 by means of fan 18. Preliminary reaction occurs in calciner 12 to drive off volatile matter and gases formed therein from the charge. These gases and vapors are recycled as will hereinafter be described.

From calciner 12 the preliminarily treated charge material flows through seal section 20 into reactor 22. The seal may be of the rotary valve or purge gas type, in the latter case the valve consisting of a passage of reduced cross section having a purge gas conduit 24 connected thereinto.

Reactor 22 is indirectly heated and preferably consists of a refractory shaft of high thermal conductivity enclosed on at least the greater portion of its external wall area by furnace chambers 26 heated by a plurality of gas or oil burners (not shown) supplied with fuel through conduit 28 from recycle line 30 and auxiliary fuel line 32. Combustion products from furnace chambers 26 are conducted away by means of flue 34.

Under the effect of the heating in reactor 22, which may reach internal temperatures as high as about 2400° F., the charge is substantially completely reacted to produce the primary product in the gaseous and/or vapor phase. The gaseous product and other gases are withdrawn from the top of the bed through conduit 36 and conducted to a suitable product recovery apparatus 38. Fan 40 is provided in gas discharge flue 42 from recovery apparatus 36 to propel the gases through the system. Condensed vapor product is recovered through discharge pipe 44.

The solid product or by-product flows from reactor 22 into a cooler 46 where it is contacted with gases discharged from calciner 12 and from product recovery apparatus 38 and conducted thereto through lines 30 and 50 respectively. In the cooler the solids are reduced in temperature to the point where they can be discharged at a controlled rate to the atmosphere through a suitable discharge mechanism, here diagrammatically shown as a seal valve 52, while the cooling gases to which the heat has been transferred are recycled to the calciner 12 through conduit 14 for the preliminary treatment previously described.

While preheating of the charge materials is an optional step in the novel process of this invention it is obviously a preferred one. The preliminary treating time can thereby be reduced while the sensible heat in the combustion product gases discharged from furnace chambers 26 can be effectively utilized. The combustion products are thus conducted through conduit 34, three way valve 54 and pipe 56 to the preheater 10 and are then discharged through flue 58 and stack 60.

In the following example typical data are presented for the production of elemental phosphorus from phosphate rock in the presence of silica as a flux, the probable equation for which being:

$$2Ca_3(PO_4)_2 + 6SiO_2 + 10C \rightarrow 6(CaO.SiO_2) + P_4 + 10CO$$

Charge material in the form of briquets is delivered to the top of preheater 10 at the rate of 590 lbs. per hour, the material being composed as follows:

|  | Lbs. | Parts by wt. |
|---|---|---|
| Phosphate rock (Calcium phosphate) | 360 | 36 |
| $SiO_2$ | 120 | 12 |
| Coal | 110 | 11 |

Recycled gas at a temperature of 2000° F. enters the bottom of the calciner and flows up through the charge which is thus heated to about 1450° F. and discharged through seal 20 at that temperature. The treating gases are withdrawn from the top of the calciner at 500–600° and recycled through solids cooler 46 where they are again heated to 2000°.

The charge, now slightly reduced in volume, flows into reactor 22 at the rate of 550 lbs. per hour and is conducted as a column through the reactor at a rate such that it reaches a temperature of 2200° at the point of discharge. During this stage of the process phosphorus vapors and CO are continually being withdrawn from reactor 22 at a temperature of about 1400° and are conducted to recovery apparatus 38. In this apparatus the phosphorous vapors are condensed to liquid phosphorous at a recovery rate of 48 lbs. per hour while CO is cycled to the cooler at the rate of 108 lbs. per hour. By-product solids are discharged from the cooler through a gas tight discharge mechanism 52 at a rate of 394 lbs. per hour and at a temperature of about 300° F. Excess recycle treating gases are delivered to the burners in heating furnaces 26 along with sufficient auxiliary fuel to provide the required amount of heating.

See also copending application Ser. No. 442,639 filed July 12, 1954, now abandoned, of Louis Burgess for examples of elemental phosphorous production which can be carried out to advantage according to the process of this invention.

It will be appreciated that the novel process of this invention is extremely versatile in that it can be employed for the production of elemental phosphorous, sodium and so on as well as for the devolatilization or dehydrogenation of carbons such as green petroleum coke, bituminous and sub-bituminous coals and so on. The embodiment of apparatus particularly adapted for the treatment of carbonaceous materials is shown in Fig. 2.

Since it is not essential that vapor stream from the carbonaceous charge be kept separate from the hot recycle gases a single continuous calcination and reaction zone may be employed instead of two such separated by a purge gas as previously described. Thus, the apparatus of Fig. 2 includes a unitary treater 70 having a continuous shaft heated for a portion of its lower length by furnaces 26 as previously described. The hot recycle gases are introduced into an upper area of the shaft through conduit 14 and there mingle with the vaporized volatile matter from the charge. These gases are then withdrawn from the top of treater 70 through conduit 16 but in this case flow first to condensible separator 72. The remaining gases are then cycled through fan 74 and conduit 76 to cooler 46 and a portion thereof may be drawn off through conduit 78 as fuel to fire the furnaces 26.

When treating carbons which tend to agglutinate a minor proportion of oxygen-containing gas can be introduced into the bottom of the pretreater 10 or into treater 70 either in the hot recycle gas stream (14) or at any other convenient point above the high temperature calcination zone.

While it has been stated above that the preheating step may be optional in the practice of this process a word of caution must be added. When the charge is not preheated volatiles carried upwardly through the charge are liable to condense on the cool material and leave an undesirable coating. Consequently, when preheating is omitted we consider it desirable, and in most cases essential, to flow the hot recycle treating gases downwardly through the charge. Obviously, this may readily be accomplished by reversing the vertical positioning of conduits 14 and 16 so that conduit 14 will enter calciner 12 or treater 70 at a point near the top and conduit 16 will be connected thereinto at a lower level. The necessary rearrangement for the purpose will be obvious to one skilled in the art in the light of this specification.

Having thus described our invention, we claim:

1. A process for heat treating solids to obtain volatile products therefrom which comprises flowing a solid charge material through a calcining zone, flowing hot gases through the body of the charge in said zone and recovering the gases, conducting the charge through a seal into a separate indirectly heated reaction zone, heating the charge therein to sufficiently elevated temperature to separate volatile products therefrom, separately recovering such volatile products substantially free from contamination by combustion product gases, conducting the treated charge material to a cooling zone, flowing gases recovered from the calcining zone through said cooling zone and in contact with treated charge material, thereby heating the gases and cooling the charge, recycling the thus heated gases without combustion thereof to the calcining zone to heat additional fresh charge material, and recovering the treated solid charge material.

2. The process of claim 1 further characterized by preheating the charge material by means of hot combustion product gases obtained from the step of indirectly heating the charge in the reaction zone.

3. The process of claim 1 in which the charge material is carbonaceous.

4. The process of claim 1 in which the charge material is an ore reducible in the presence of carbon to an elemental material.

5. The process of claim 4 in which the charge material is a mixture of phosphate rock, silica and carbon.

6. The process of claim 4 in which the charge material is a mixture of sodium containing ore and carbon.

7. A process for heat treating solids to obtain volatile products therefrom which comprises continuously conducting free-flowing solid material through a calcining zone, heating said material therein by direct heat exchange with a countercurrent flowing stream of previously separated gases without combustion of said gases to a temperature below that at which substantial separation of volatile matter therefrom occurs, flowing the heated material substantially through a seal zone into a separate reaction zone, further heating said material without contamination by combustion product gases by indirect heat exchange to a temperature at which substantially all of the volatile matter is separated as gas and vapor therefrom, removing said volatilized matter and liberated gases from said zone and separately recovering the condensible volatile matter, flowing the residue solid material and gases separated therefrom in separate streams to a cooling zone, flowing the gases through the solid material, thereby cooling said material and heating the gases, flowing the hot gases to said first mentioned calcining zone, and recovering the cooled solid material.

8. The process of claim 7 in which the free-flowing solid material is composed of an intimate admixture of pulverized phosphate rock, carbon and silica.

9. The process of claim 7 in which the free-flowing solid material is a high volatile carbonaceous material.

10. The process of claim 7 in which the free-flowing solid material is in the form of discrete particles.

11. The process of claim 7 in which the free-flowing solid material is in the form of agglomerates.

12. A process for heat treating solid materials which comprises slowly flowing such material substantially free from contamination by combustion product gases in a column downwardly through a refractory shaft externally heated for a portion of its lower length, introducing a stream of hot unburned recycle gases into the column of solids at a level above the top of the externally heated section of the shaft, flowing said gases lengthwise through a portion of the column thereby effecting calcination of said material, withdrawing the gases from the column at a higher level and separating condensible materials therefrom, flowing the condensibles-free gases through the body of solid materials in a separate zone below the indirectly heated zone thereby cooling the solids and heating the gases, recovering the cooled solids, and recycling the heated gases to the column of solid materials as first set forth above.

13. The process of claim 12 in which the solid material is carbonaceous and in particulate form.

14. The process of claim 12 in which the solid material is preheated prior to introduction into the hot gas treating zone.

References Cited in the file of this patent

UNITED STATES PATENTS

| | | |
|---|---|---|
| 2,029,309 | Curtis et al. | Feb. 4, 1936 |
| 2,131,702 | Berry | Sept. 27, 1938 |
| 2,168,312 | Baily | Aug. 8, 1939 |
| 2,514,497 | Jones | July 11, 1950 |
| 2,671,015 | Morley | Mar. 2, 1954 |
| 2,675,307 | Klugh et al. | Apr. 13, 1954 |
| 2,710,828 | Scott | June 14, 1955 |
| 2,755,232 | Dougherty | July 17, 1956 |

FOREIGN PATENTS

| | | |
|---|---|---|
| 683,645 | France | June 16, 1930 |